United States Patent Office 3,460,900
Patented Aug. 12, 1969

3,460,900
METHOD OF REMOVING TITANIUM
TETRACHLORIDE FROM GASES
Iuliu Moldovan, Bucharest str. Ana Davila 47–49, Rumania, and Galina M. Grudner, Bucharest str. Romulus No. 81, Rumania
No Drawing. Filed July 22, 1965, Ser. No. 474,154
Claims priority, application Rumania, Jan. 21, 1965, 49,096
Int. Cl. B01d 47/00; C01b 9/00
U.S. Cl. 23—2    3 Claims

ABSTRACT OF THE DISCLOSURE

Process for removing titanium tetrachloride from gases which comprises contacting said gases with an aqueous solution of hydrochloric or sulfuric acid.

This invention relates to a process for removing the titanium tetrachloride from the gases resulting from the furnaces used for titaniferous materials chlorination.

In the present processes used for producing the titanium tetrachloride by chlorinating the titaniferous materials, one of the most complex processing phases is the condensation of the gases resulting from the chlorinator to liquid $TiCl_4$. Though the $TiCl_4$ condensation temperature is 136° C., the condensation of the gaseous $TiCl_4$ should be performed at much lower temperatures in order to avoid great $TiCl_4$ losses, since $TiCl_4$ has a high vapor tension even at normal temperature.

For this reason, in some plants, the gaseous $TiCl_4$ condensation is accomplished by using liquid $TiCl_4$ for cooling. In this case, in order to obtain the best gaseous $TiCl_4$ condensation, the recycling of great quantities of liquid $TiCl_4$ is necessary, which fact leads to a considerable increase of the plant size and to a higher cost of the final product.

Another way for accomplishing the best condensation of the gaseous $TiCl_4$ consists in cooling the products intensely (up to the melting point of $TiCl_4$, −24.8° C.) which involves the use of refrigeration equipment.

In the process according to the invention, the resulting gases from the chlorination furnace, after passing through dust-catching devices in which concomitantly the gases are cooled to about 140–250° C., are introduced at this temperature into an absorption apparatus in which an acid solution is present, which, by an adequate cooling is maintained at a temperature ranging from 5 to 50° C.

Solution of 20–33% HCl, or 20–98% $H_2SO_4$ are used for absorption as such or recirculated in a continuous process. Contacting the hot gases containing titanium tetrachloride with a solution of hydrochloric acid results in the formation of a solution of hexachlorotitanic acid and such contact with a solution of sulfuric acid results in the formation of a solution of titanyl sulfate.

Both types of acid solutions absorb $TiCl_4$ in an amount up to 400 grams per liter. The $TiCl_4$ absorption even from hot gases, under the described temperature conditions, takes place almost entirely in the first absorption reactor. In this way, by using the proposed process, the losses of $TiCl_4$ in waste gases are completely avoided.

The process for absorption of titanium tetrachloride gases in acid solutions may also be used to remove residual titanium tetrachloride remaining in the waste gases, after the condensation of titanium tetrachloride.

Further, three examples of removing gases $TiCl_4$, according to invention, are given.

Example I

Into an absorption reactor containing 1000 ml. of 25% $H_2SO_4$ solution, gases obtained by the chlorination of titaniferous materials are introduced, corresponding to a rate of 10 liters per hour titanium tetrachloride (rate established under standard conditions). The gas temperature at the absorption reactor input is 200° C., and the solution temperature inside the absorption reactor is maintained at 20° C. After 3 hours of processing, 250 grams per liter $TiCl_4$ is retained, a practically total absorption taking place.

Example II

In an absorption reactor containing 100 l. of 30% HCl solution, gases obtained by the chlorination of titaniferous materials are introduced, corresponding to a rate of 940 liters per hour titanium tetrachloride (rate established under standard conditions). The gases temperature at the absorption reactor input is 180° C., and the solution temperature inside the absorption reactor is maintained at 10° C.

After 4 hours of processing, 320 grams per liter $TiCl_4$ is retained in solution, a practically total absorption taking place.

Example II

In an absorption reactor containing 100 l. of 30% HCl solution, gases obtained by the chlorination of titaniferous materials are introduced, corresponding to a rate of 1460 liters per hour titanium tetrachloride (rate established under standard conditions). The gases temperature at the absorption reactor input is 180° C., and the solution temperature inside the reactor is maintained at 25° C. After 3 hours of processing, 370 grams per liter $TiCl_4$ is retained in solution, a practically total absorption taking place.

The process according to invention, presents the following advantages:

Allows practically total removal of titanium tetrachloride in acid solution in the first absorption reactor, replacing by this way, in a single phase of absorption, the stages of condensation used in the plants for titanium tetrachloride recovery by the titaniferous materials chlorination process.

Replaces the titanium tetrachloride stages of condensation by absorption in liquid phase, eliminating the final $TiCl_4$ losses with the waste gases, which takes place in the case of stage-wise condensation.

The titanium acid solutions allows a more easily handling than the liquid $TiCl_4$, and can be used as raw material for producing the complex titanium salts as well as for other processes.

We claim:

1. A process for removing titanium tetrachloride from gases comprising contacting said gases with an aqueous acid solution selected from the group consisting of a 20–33% solution of hydrochloric acid and a 20–93% solution of sulfuric acid.

2. The process of claim 1 in which the said gases which are contacted with said aqueous acid solution are from 140° to 230° C.

3. The process of claim 1 in which the said aqueous acid solution is maintained between 5–50° C.

References Cited

UNITED STATES PATENTS 3,310,377  3/1967  Stern et al. _____ 23—87

OTHER REFERENCES

Snell et al.: "Dictionary of Commercial Chemicals," D. Van Nostrand Company, Inc., Princeton, N.J., 3rd. ed., 1962, p. 186.

OSCAR R. VERTIZ, Primary Examiner

E. C. THOMAS, Assistant Examiner

U.S. Cl. X.R.

23—87, 117, 139